United States Patent
Lin et al.

(10) Patent No.: US 11,194,651 B2
(45) Date of Patent: Dec. 7, 2021

(54) METHOD FOR GRACEFULLY HANDLING QAT HARDWARE OR CPU SOFTWARE FAILURES BY DYNAMICALLY SWITCHING BETWEEN QAT HARDWARE AND CPU SOFTWARE FOR DATA COMPRESSION AND DECOMPRESSION

(71) Applicant: EMC IP Holding Company LLC, Hopkinton, MA (US)

(72) Inventors: Wei Lin, Beijing (CN); Yujuan Li, Beijing (CN); Tao Chen, Beijing (CN); Yong Zou, San Jose, CA (US); Rahul Ugale, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 116 days.

(21) Appl. No.: 16/600,398

(22) Filed: Oct. 11, 2019

(65) Prior Publication Data
US 2021/0109803 A1 Apr. 15, 2021

(51) Int. Cl.
*G06F 11/00* (2006.01)
*G06F 11/07* (2006.01)
*G06F 9/50* (2006.01)

(52) U.S. Cl.
CPC ........ *G06F 11/0793* (2013.01); *G06F 9/5027* (2013.01); *G06F 11/0715* (2013.01); *G06F 11/0721* (2013.01)

(58) Field of Classification Search
CPC ............ G06F 11/0793; G06F 11/0721; G06F 11/1402; G06F 11/2028
See application file for complete search history.

(56) References Cited

U.S. PATENT DOCUMENTS

| | | | |
|---|---|---|---|
| 2012/0239904 A1* | 9/2012 | Ekanadham | G06F 9/3851 711/207 |
| 2017/0293510 A1* | 10/2017 | Memon | G06F 11/0751 |
| 2019/0347152 A1* | 11/2019 | Schardt | G06F 11/1428 |

* cited by examiner

*Primary Examiner* — Philip Guyton
(74) *Attorney, Agent, or Firm* — Womble Bond Dickinson (US) LLP

(57) ABSTRACT

A method, apparatus, and system for handling a failure of a hardware cryptography/compression accelerator is disclosed. The operations comprise: detecting that a hardware cryptography/compression accelerator at a first data storage system has failed; determining one or more failed cryptography and/or compression operation tasks that were submitted to the hardware cryptography/compression accelerator but were not completed due to the failure of the hardware cryptography/compression accelerator; and performing a remedial operation in response to the hardware cryptography/compression accelerator failure to prevent a systemic failure.

21 Claims, 5 Drawing Sheets

METHOD FOR GRACEFULLY HANDLING QAT HARDWARE OR CPU SOFTWARE FAILURES BY DYNAMICALLY SWITCHING BETWEEN QAT HARDWARE AND CPU SOFTWARE FOR DATA COMPRESSION AND DECOMPRESSION

FIELD OF THE INVENTION

Embodiments of the present invention relate generally to data storage systems. More particularly, embodiments of the invention relate to hardware failure handling in a data storage system.

BACKGROUND

Intel QuickAssist Technology (QAT) provides security and compression acceleration capabilities to improve performance and efficiency on computing platforms. In particular, a dedicated hardware cryptography/compression accelerator chip, which may be referred to hereinafter as the (Intel) QAT hardware accelerator, is provided. Compute-intensive security and compression operations, such as symmetric cryptography functions, asymmetric cryptography functions, and compression and decompression functions, can be offloaded from the main processor(s) (e.g., the central processing unit "CPU") to the QAT hardware accelerator.

The QAT hardware accelerator provides significant performance improvement in a data storage system due to the acceleration of frequent compression and decompression tasks that need to be executed by such a system. However, when the QAT hardware fails, there is a risk that the failure of the QAT hardware may cause the whole data storage system to fail.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
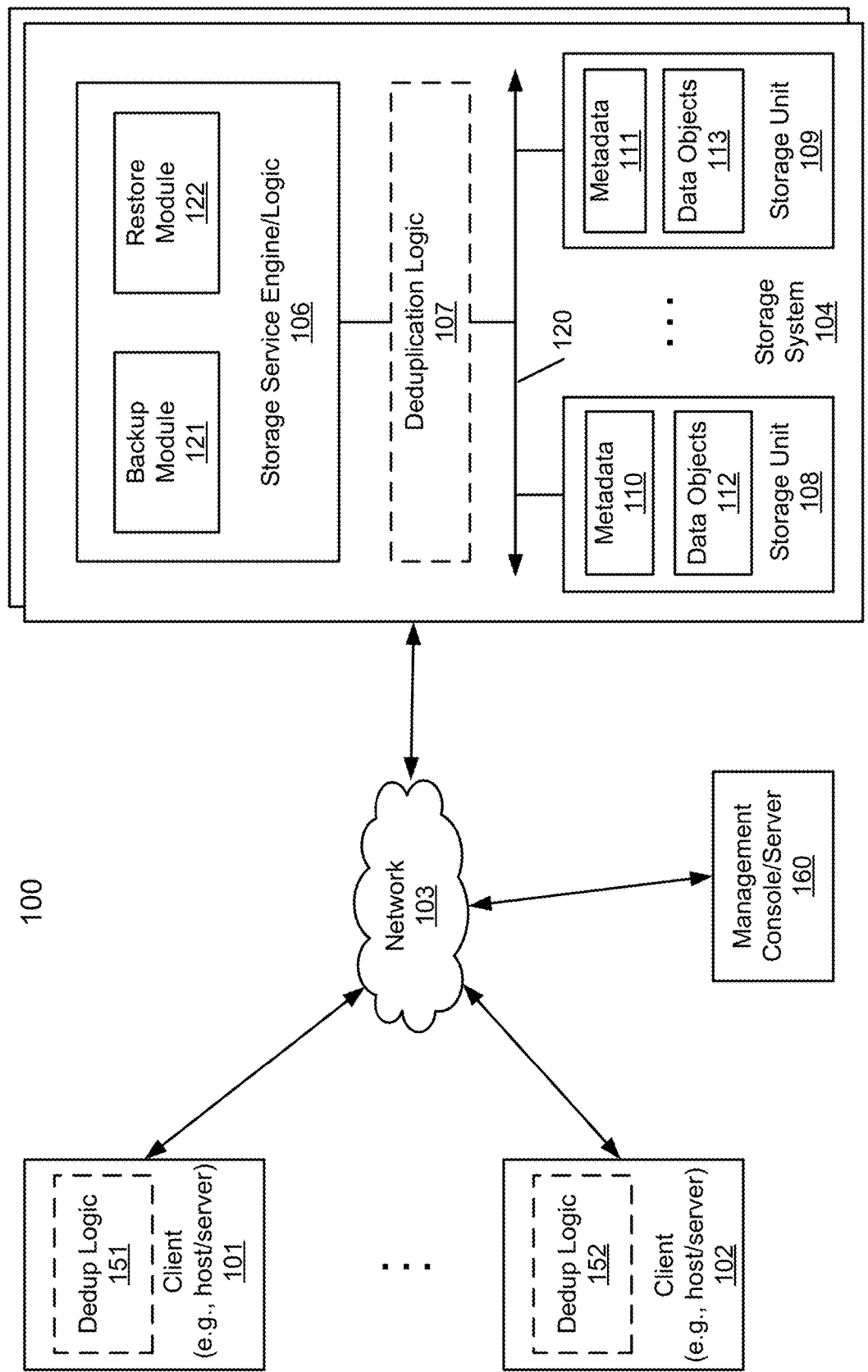
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

When the QAT hardware fails, there is a risk that the failure of the QAT hardware may cause the whole data storage system to fail, because pending compression or decompression operations assigned to the QAT hardware may fail to execute. Further, subsequent compression or decompression operations may also fail to execute due to the unavailability of the QAT hardware.

A method, apparatus, and system for handling a failure of a hardware cryptography/compression accelerator is disclosed. First, that a hardware cryptography/compression accelerator at a first data storage system has failed may be detected. Next, one or more failed cryptography and/or compression operation tasks that were submitted to the hardware cryptography/compression accelerator but were not completed due to the failure of the hardware cryptography/compression accelerator may be determined. Thereafter, a remedial operation may be performed in response to the hardware cryptography/compression accelerator failure to prevent a systemic failure. In particular, the affected failed cryptography/compression operation tasks may be resubmitted either to a general purpose processor or to another accelerator at a different node (system), depending on the system configuration. Subsequent cryptography/compression operations may also be redirected accordingly.

In one embodiment, the first data storage system is in a single node configuration. Performing the remedial operation further comprises: resubmitting the failed cryptography and/or compression operation tasks to a central processing unit (CPU) at the first data storage system for execution; and switching subsequent cryptography and/or compression operation tasks to execution on the CPU. In a further embodiment, performing the remedial operation further comprises: in response to the hardware cryptography/compression accelerator becoming operational again, switching subsequent cryptography and/or compression operation tasks back to execution on the hardware cryptography/compression accelerator.

In one embodiment, the first data storage system is in a dual node configuration together with a second data storage system. Performing the remedial operation further comprises: resubmitting the failed cryptography and/or compression operation tasks to a hardware cryptography/compression accelerator at the second data storage system for execution; and switching subsequent cryptography and/or compression operation tasks to execution on the hardware cryptography/compression accelerator at the second data storage system.

In one embodiment, the first data storage system updates the second data storage system on a system operation status of the first data storage system with heartbeats.

In one embodiment, the heartbeats are transmitted through a system interconnect between the first data storage system and the second data storage system.

In one embodiment, the first data storage system updating the second data storage system on the system operation status of the first data storage system further comprises: writing, by the first data storage system, system operation status information of the first data storage system to a storage device accessible to both the first data storage system and the second data storage system; and reading, by the second data storage system, the system operation status information of the first data storage system from the storage device.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2:
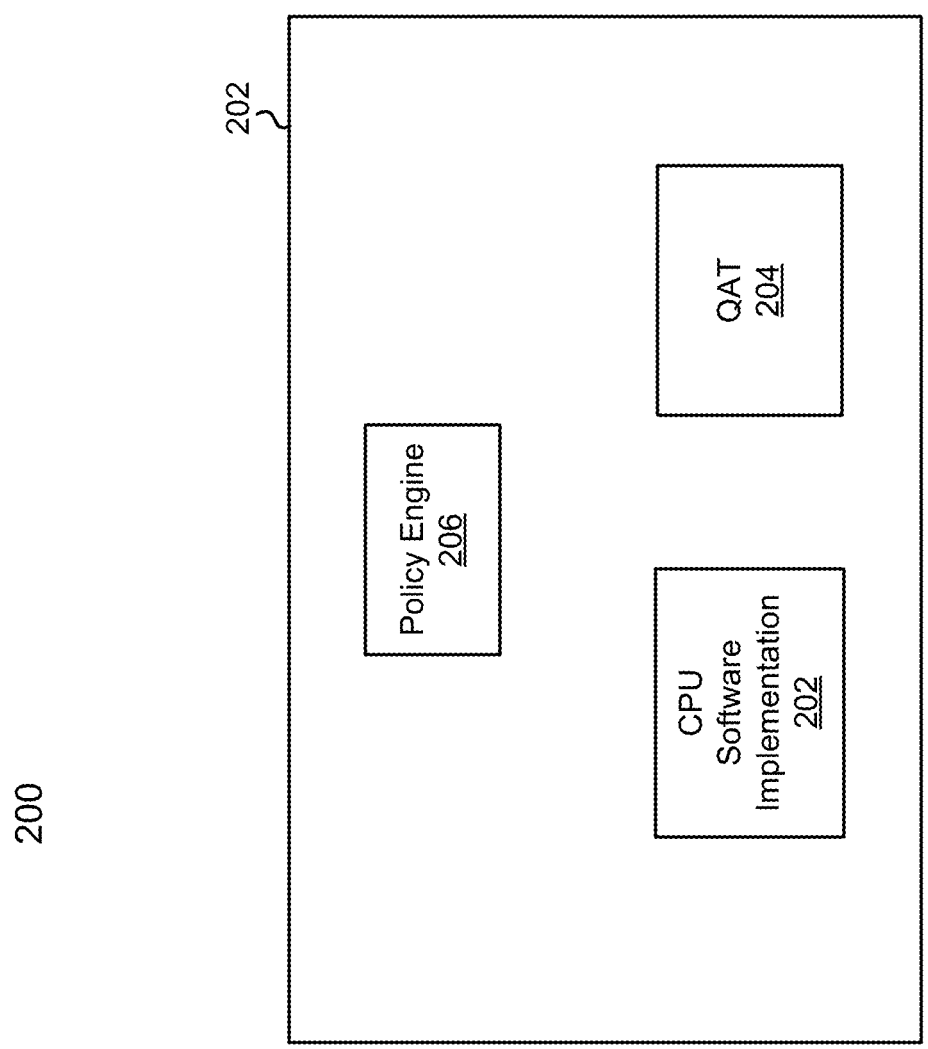
FIG. 2 is a block diagram illustrating an example data storage system configuration according to one embodiment.

Referring to FIG. 2, a block diagram illustrating an example data storage system configuration 200 according to one embodiment is shown. The data storage system configuration 200 is a single node configuration where a data storage system 202 (which may correspond to, e.g., storage system 104 in FIG. 1) operates as a standalone unit. Under the control of a policy engine 206, compression, decompression, or other authentication/cryptography operations may be executed either on a QAT 204, or with a software implementation on a central processing unit (CPU) 202. These operations may be referred to hereinafter, collectively, as cryptography and/or compression operation. The policy engine 206 may be implemented in suitable hardware, or a combination of software and hardware which may include, e.g., processor 1501 of FIG. 5. Under normal operation conditions, the cryptography and/or compression operations are executed on the QAT 204 to take advantage of the performance improvement brought about through hardware acceleration.

When the QAT 204 fails, the failure may be detected, for example, by the policy engine 206 or any other suitable module of the data storage system 202. One or more failed cryptography and/or compression operation tasks that were submitted to QAT 204 but were not completed due to the failure of the QAT 204 may be determined. Accordingly, a remedial operation may be performed in response to the QAT 204 failure to prevent a systemic failure of the data storage system 202.

In particular, to prevent the systemic failure, the policy engine 206 may resubmit the failed cryptography and/or compression operation tasks to the CPU for software-implemented execution. Further, the policy engine 206 may switch subsequent cryptography and/or compression operation tasks to execution on the CPU. Therefore, a systemic failure caused by the failure of the QAT 204 may be averted. If the QAT 204 becomes operational again (e.g., after a replacement of the faulty hardware or a hardware reset), the policy engine 206 may detect the updated status of the QAT 204 and switch subsequent cryptography and/or compression operation tasks back to execution on the QAT 204 in order to take advantage of the performance improvement.

Figure 3:
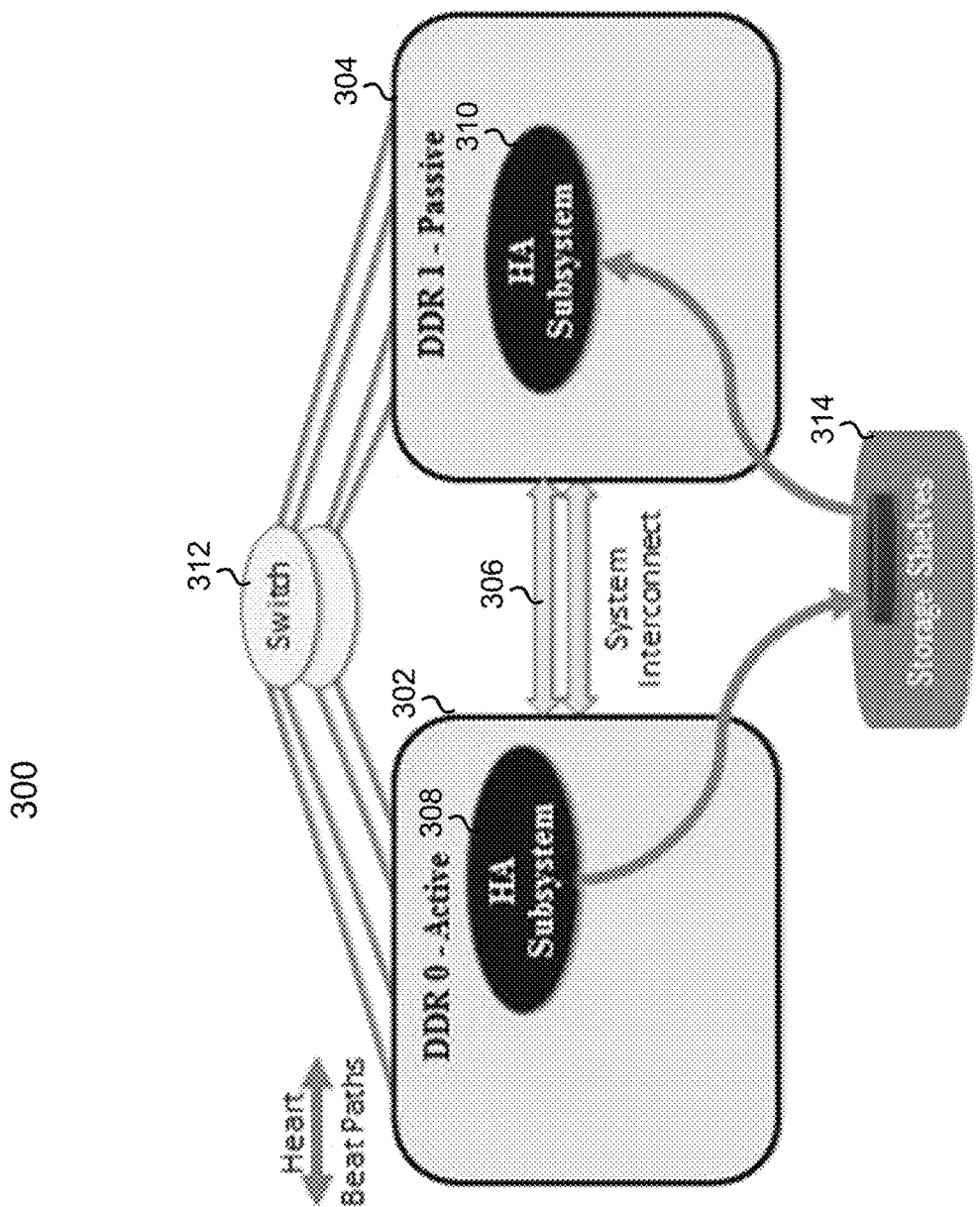
FIG. 3 is a block diagram illustrating an example data storage system configuration according to one embodiment.

Referring to FIG. 3, a block diagram illustrating an example data storage system configuration 300 according to one embodiment is shown. The data storage system configuration 300 is a dual node configuration where a first data storage system 302 and a second data storage system 304 (either of which may correspond to, e.g., storage system 104 in FIG. 1) operate in an active-passive (or master-slave, primary-secondary, etc.) configuration. A switch 312 distributes downstream data, instructions, or other signals to both the first data storage system 302 and the second data storage system 304. Therefore, under normal operation conditions, data operations including cryptography and/or compression operations are executed at the first data storage system 302, and the second data storage system 304 acts as a backup in case the first data storage system 304 encounters any issue. The first data storage system 302 and the second data storage system 304 is further connected through a system interconnect 306 for information exchange. Accordingly, the first data storage system 302 and the second data storage system 304 are aware of each other's status including the active data and the active operations being executed. Both of the first data storage system 302 and the second data storage system 304 are equipped with a CPU and a QAT. The operations of the first data storage system 302 and the second data storage system 304 may be coordinated by any suitable module (which may be implemented in either hardware or software) in either of the first data storage system 302 and the second data storage system 304, or by modules in both data storage systems in a cooperative fashion.

In one embodiment, the first data storage system 302 updates the second data storage system 304 on a system operation status of the first data storage system 302 with heartbeats. For example, the heartbeats may be transmitted through the system interconnect 306 between the first data storage system 302 and the second data storage system 304. In another embodiment, the first data storage system 302 may update the second data storage system 304 on its the system operation status through data written to a storage device 314. In particular, the first data storage system 302 (through a high-availability subsystem 308) may write its system operation status information (which may include, for example, the high-availability state, the system identifier, the sequence numbers, etc.) to the storage device 314 that is accessible to both the first data storage system 302 and the second data storage system 304. Then, the second data storage system 304 (through a high-availability subsystem 310) may read the system operation status information of the first data storage system 302 from the storage device 314. It should be appreciated that in one embodiment, the second data storage system 304 may learn about the failure of the first data storage system 302 when the expected latest status update data is missing on the storage device 314.

When the QAT at the first data storage system 302 fails, the failure may be detected. One or more failed cryptography and/or compression operation tasks that were submitted to the QAT at the first data storage system 302 but were not completed due to the failure of the QAT may be determined. Accordingly, a remedial operation may be performed in response to the failure of the QAT at the first data storage system 302 to prevent a systemic failure in the dual node configuration.

In one embodiment, to prevent the systemic failure, the failed cryptography and/or compression operation tasks may be submitted to the QAT at the second data storage system 304 for execution. Further, subsequent cryptography and/or compression operation tasks may be assigned to the QAT at the second data storage system 304.

In one embodiment, when other components of the first data storage system 302 than the QAT are still operational, only cryptography and/or compression operation tasks are switched to execution at the second data storage system 304 (by its QAT), while other operations remain to be executed at the first data storage system 302. In another embodiment, all operations are switched to execution at the second data storage system 304 (including by its QAT) after the failure of the QAT of the first data storage system 302, even if other components of the first data storage system 302 than the QAT are still operational.

In one embodiment, If the QAT of the first data storage system 302 becomes operational again (e.g., after a replacement of the faulty hardware or a hardware reset), the updated status of the QAT of the first data storage system 302 may be detected, and subsequent operations (including cryptography and/or compression operation tasks) may be switched back to execution at the first data storage system 302 (including at its QAT).

Figure 4:
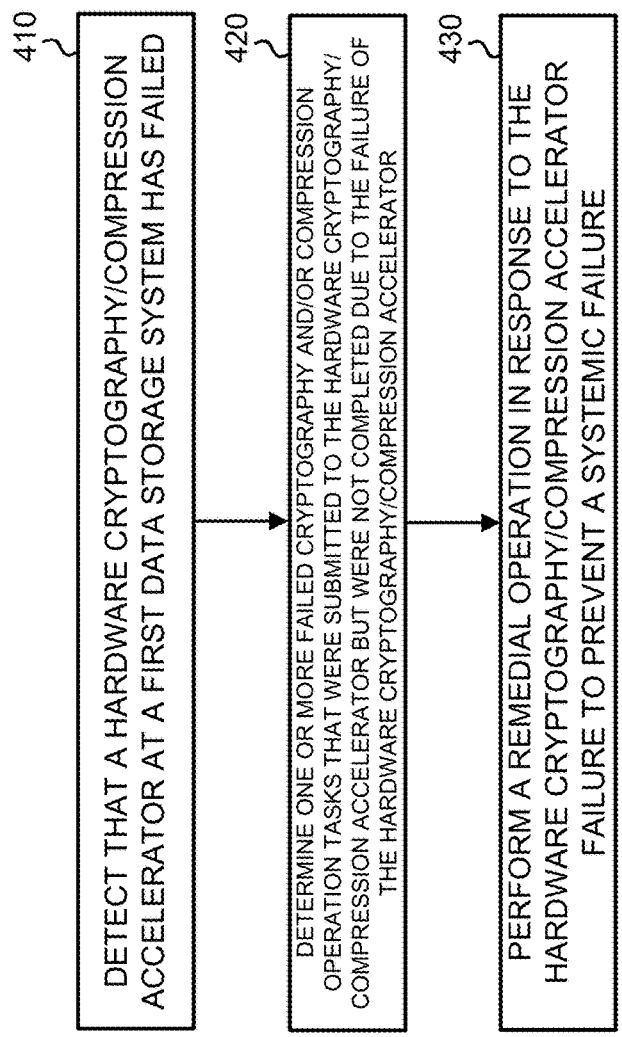
FIG. 4 is a flowchart illustrating an example method for handling a failure of a hardware cryptography/compression accelerator according to one embodiment.

FIG. 4 a flowchart illustrating an example method 400 for handling a failure of a hardware cryptography/compression accelerator according to one embodiment. Process 400 may be performed by processing logic that includes hardware (e.g. circuitry, dedicated logic, etc.), software (e.g., embodied on a non-transitory computer readable medium), or a combination thereof. For example, process 400 may be performed by processor 1501 of FIG. 5. Referring to FIG. 4, at block 410, that a hardware cryptography/compression accelerator at a first data storage system has failed may be detected. At block 420, one or more failed cryptography and/or compression operation tasks that were submitted to the hardware cryptography/compression accelerator but were not completed due to the failure of the hardware cryptography/compression accelerator may be determined. At block 430, a remedial operation may be performed in response to the hardware cryptography/compression accelerator failure to prevent a systemic failure. In particular, the affected failed cryptography/compression operation tasks may be resubmitted either to a general purpose processor or to another accelerator at a different node (system), depending on the system configuration. Subsequent cryptography/compression operations may also be redirected accordingly.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
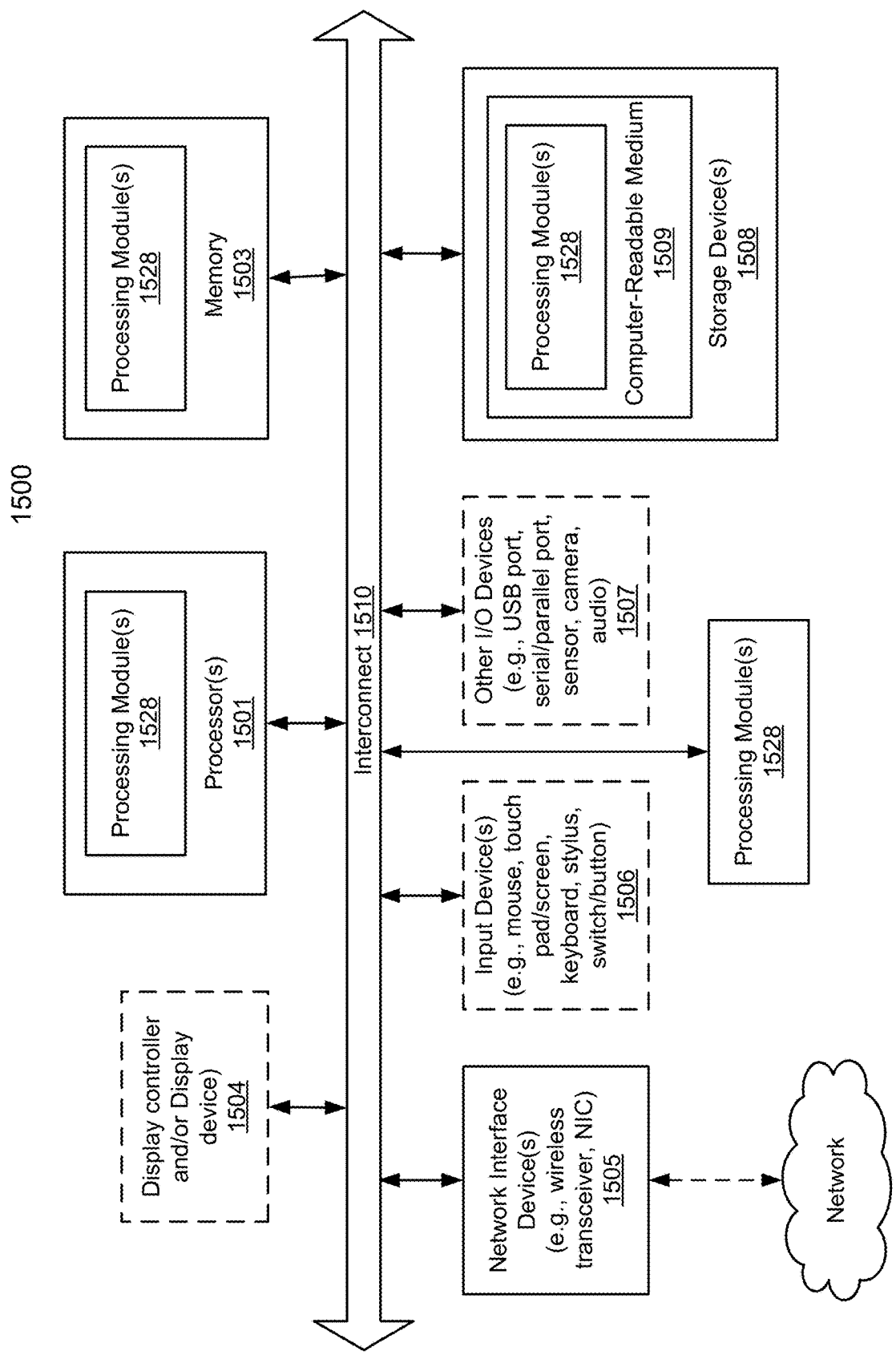
FIG. 5 is a block diagram illustrating a data processing system according to one embodiment.

FIG. 5 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, an operation scheduling policy engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Therefore, embodiments of the disclosure relate to handling of a failure of a hardware cryptography/compression accelerator (e.g., an Intel QAT) in a data storage system. Upon detection of the failure, the affected failed cryptography/compression operation tasks are resubmitted either to a general purpose processor or to another accelerator at a different node (system), depending on the system configuration. Subsequent cryptography/compression operations are also redirected accordingly. Therefore, a systemic failure caused by the failure of the hardware cryptography/compression accelerator may be avoided.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
obtaining backup data for a client;
preparing the backup data for storage by deduplicating the backup data to obtain deduplicated backup data;
detecting that a hardware cryptography/compression accelerator, used to prepare the deduplicated backup data for storage, at a first data storage system has failed;
determining one or more failed cryptography and/or compression operation tasks that were submitted to the hardware cryptography/compression accelerator for preparing the deduplicated backup data for storage but were not completed due to a failure of the hardware cryptography/compression accelerator;

performing a remedial operation in response to the failure of the hardware cryptography/compression accelerator to prevent a systemic failure and ensure completion of the failed cryptography and/or compression operation tasks to obtain prepared deduplicated backup data; and storing the prepared deduplicated backup data for future restoration of the client.

2. The method of claim 1, wherein the first data storage system is in a single node configuration, and performing the remedial operation further comprises:

resubmitting the failed cryptography and/or compression operation tasks to a central processing unit (CPU) at the first data storage system for execution; and switching subsequent cryptography and/or compression operation tasks for preparing the deduplicated backup data for storage to execution on the CPU.

3. The method of claim 2, wherein performing the remedial operation further comprises:

in response to the hardware cryptography/compression accelerator becoming operational again, switching subsequent cryptography and/or compression operation tasks for preparing the deduplicated backup data for storage back to execution on the hardware cryptography/compression accelerator.

4. The method of claim 1, wherein the first data storage system is in a dual node configuration together with a second data storage system, and performing the remedial operation further comprises:

resubmitting the failed cryptography and/or compression operation tasks to a hardware cryptography/compression accelerator at the second data storage system for execution; and switching subsequent cryptography and/or compression operation tasks to execution on the hardware cryptography/compression accelerator at the second data storage system.

5. The method of claim 4, wherein the first data storage system updates the second data storage system on a system operation status of the first data storage system with heartbeats.

6. The method of claim 5, wherein the heartbeats are transmitted through a system interconnect between the first data storage system and the second data storage system.

7. The method of claim 5, wherein the first data storage system updating the second data storage system on the system operation status of the first data storage system further comprises:

writing, by the first data storage system, system operation status information of the first data storage system to a storage device accessible to both the first data storage system and the second data storage system; and reading, by the second data storage system, the system operation status information of the first data storage system from the storage device.

8. A non-transitory machine-readable medium having instructions stored therein, which when executed by a processor, cause the processor to perform data processing operations, the operations comprising:

obtaining backup data for a client;

preparing the backup data for storage by deduplicating the backup data to obtain deduplicated backup data;

detecting that a hardware cryptography/compression accelerator, used to prepare the deduplicated backup data for storage, at a first data storage system has failed;

determining one or more failed cryptography and/or compression operation tasks that were submitted to the hardware cryptography/compression accelerator for preparing the deduplicated backup data for storage but were not completed due to a failure of the hardware cryptography/compression accelerator;

performing a remedial operation in response to the failure of the hardware cryptography/compression accelerator to prevent a systemic failure and ensure completion of the failed cryptography and/or compression operation tasks to obtain prepared deduplicated backup data; and storing the prepared deduplicated backup data for future restoration of the client.

9. The non-transitory machine-readable medium of claim 8, wherein the first data storage system is in a single node configuration, and performing the remedial operation further comprises:

resubmitting the failed cryptography and/or compression operation tasks to a central processing unit (CPU) at the first data storage system for execution; and switching subsequent cryptography and/or compression operation tasks for preparing the deduplicated backup data for storage to execution on the CPU.

10. The non-transitory machine-readable medium of claim 9, wherein performing the remedial operation further comprises:

in response to the hardware cryptography/compression accelerator becoming operational again, switching subsequent cryptography and/or compression operation tasks for preparing the deduplicated backup data for storage back to execution on the hardware cryptography/compression accelerator.

11. The non-transitory machine-readable medium of claim 8, wherein the first data storage system is in a dual node configuration together with a second data storage system, and performing the remedial operation further comprises:

resubmitting the failed cryptography and/or compression operation tasks to a hardware cryptography/compression accelerator at the second data storage system for execution; and switching subsequent cryptography and/or compression operation tasks to execution on the hardware cryptography/compression accelerator at the second data storage system.

12. The non-transitory machine-readable medium of claim 11, wherein the first data storage system updates the second data storage system on a system operation status of the first data storage system with heartbeats.

13. The non-transitory machine-readable medium of claim 12, wherein the heartbeats are transmitted through a system interconnect between the first data storage system and the second data storage system.

14. The non-transitory machine-readable medium of claim 12, wherein the first data storage system updating the second data storage system on the system operation status of the first data storage system further comprises:

writing, by the first data storage system, system operation status information of the first data storage system to a storage device accessible to both the first data storage system and the second data storage system; and reading, by the second data storage system, the system operation status information of the first data storage system from the storage device.

15. A data processing system, comprising:

a processor; and a memory coupled to the processor to store instructions, which when executed by the processor, cause the processor to perform data processing operations, the operations including:

obtaining backup data for a client;

preparing the backup data for storage by deduplicating the backup data to obtain deduplicated backup data;

detecting that a hardware cryptography/compression accelerator, used to prepare the deduplicated backup data for storage, at a first data storage system has failed;

determining one or more failed cryptography and/or compression operation tasks that were submitted to the hardware cryptography/compression accelerator for preparing the deduplicated backup data for storage but were not completed due to a failure of the hardware cryptography/compression accelerator;

performing a remedial operation in response to the failure of the hardware cryptography/compression accelerator to prevent a systemic failure and ensure completion of the failed cryptography and/or compression operation tasks to obtain prepared deduplicated backup data; and storing the prepared deduplicated backup data for future restoration of the client.

16. The data processing system of claim 15, wherein the first data storage system is in a single node configuration, and performing the remedial operation further comprises:

resubmitting the failed cryptography and/or compression operation tasks to a central processing unit (CPU) at the first data storage system for execution; and switching subsequent cryptography and/or compression operation tasks for preparing the deduplicated backup data for storage to execution on the CPU.

17. The data processing system of claim 16, wherein performing the remedial operation further comprises:

in response to the hardware cryptography/compression accelerator becoming operational again, switching subsequent cryptography and/or compression operation tasks for preparing the deduplicated backup data for storage back to execution on the hardware cryptography/compression accelerator.

18. The data processing system of claim 15, wherein the first data storage system is in a dual node configuration together with a second data storage system, and performing the remedial operation further comprises:

resubmitting the failed cryptography and/or compression operation tasks to a hardware cryptography/compression accelerator at the second data storage system for execution; and switching subsequent cryptography and/or compression operation tasks to execution on the hardware cryptography/compression accelerator at the second data storage system.

19. The data processing system of claim 18, wherein the first data storage system updates the second data storage system on a system operation status of the first data storage system with heartbeats.

20. The data processing system of claim 19, wherein the heartbeats are transmitted through a system interconnect between the first data storage system and the second data storage system.

21. The data processing system of claim 19, wherein the first data storage system updating the second data storage system on the system operation status of the first data storage system further comprises:

writing, by the first data storage system, system operation status information of the first data storage system to a storage device accessible to both the first data storage system and the second data storage system; and reading, by the second data storage system, the system operation status information of the first data storage system from the storage device.

* * * * *